July 12, 1949.  C. M. HASTY ET AL  2,475,892
ROCK OR STONE SAW
Filed May 27, 1947  2 Sheets-Sheet 1

Inventors
Lee R. Baker
Charles M. Hasty

By *Clarence A. O'Brien and Harvey B. Jacobson*
Attorneys

July 12, 1949.  C. M. HASTY ET AL  2,475,892
ROCK OR STONE SAW
Filed May 27, 1947  2 Sheets-Sheet 2

Inventors
Lee R. Baker
Charles M. Hasty

By *Clarence A. O'Brien
and Harvey B. Jacobson*
Attorneys

Patented July 12, 1949

2,475,892

UNITED STATES PATENT OFFICE 2,475,892

ROCK OR STONE SAW

Charles M. Hasty and Lee R. Baker, Austin, Tex.

Application May 27, 1947, Serial No. 750,732

3 Claims. (Cl. 125—15)

The present invention relates to new and useful improvements in rock saws and more particularly to a saw for cutting stone, rock, masonry or other hard substances.

An important object of the present invention is to provide an improved saw of this character to more speedily saw stone or other material by means of toothed or star-shaped wheels rotatably mounted at the circumference of a circular saw or at the edge of a straight reciprocating saw.

A further object of the invention is to provide a saw of laminated construction and arranging the cutting wheels in a staggered relation at the cutting edge of the saw so that the wheels will work throughout the entire width of the saw.

A still further object is to provide a device of this character of simple and practical construction, which is efficient and reliable in operation, relatively inexpensive to manufacture and otherwise well adapted to the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
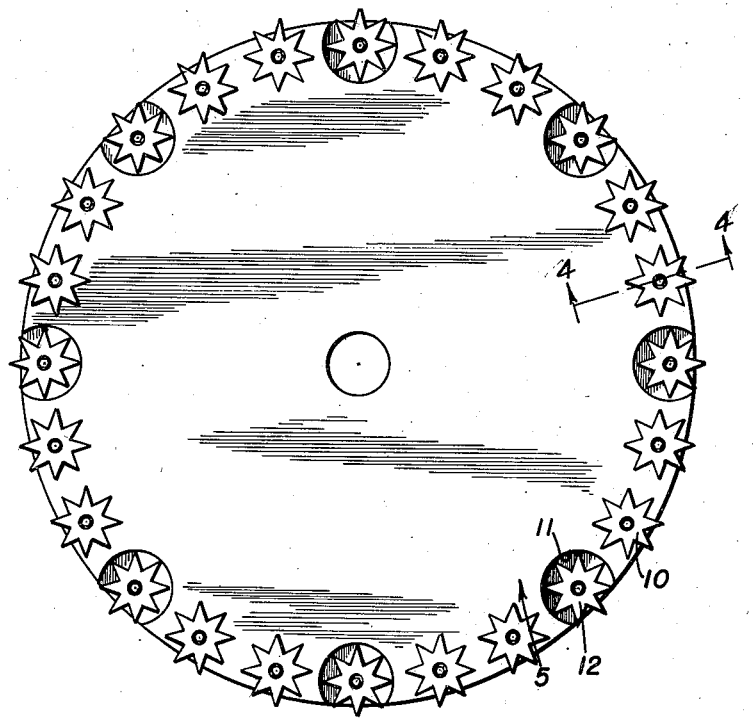
Figure 1 is a side elevational view of a circular saw constructed in accordance with the present invention.

Referring now to the drawings in detail and first with respect to the form of the invention illustrated in Figures 1 to 4, inclusive, the numeral 5 designates a circular saw generally which is composed of a plurality of disks and including an intermediate disk 6 and a pair of side disks 7 secured to the opposite sides of the intermediate disk 6 in any suitable manner to provide a circular saw of laminated construction.

A plurality of bolts 8 extend transversely of the disks 6 and 7 adjacent the peripheral edge there-of and on which toothed or star-shaped cutting wheels 9 are rotatably mounted.

Figure 2:
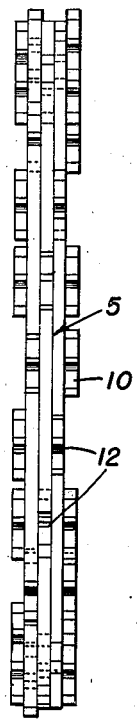
Figure 2 is an edge elevational view thereof.
Figure 3:
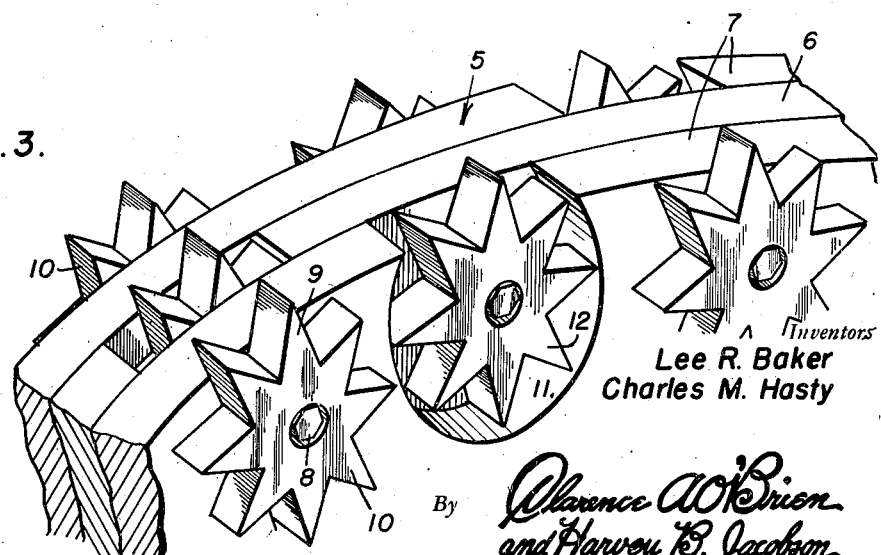
Figure 3 is an enlarged fragmentary perspective view of the cutting edge of the saw.
Figure 4:
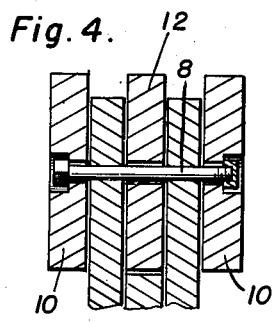
Figure 4 is a fragmentary sectional view taken substantially on the line 4—4 of Figure 1.

As shown more clearly in Figure 3 of the drawings, certain of the cutting wheels 9 are positioned against the outer surfaces of the circular saw 5 as shown at 10 while other of the cutting wheels work in recesses 11 in the peripheral edges of the respective disks as shown at 12. Both the intermediate disk 6 and the side disks 7 are provided with the recesses 11 whereby the wheels or cutters 9 will work throughout the entire width of the saw as well as outwardly at the opposite side edges of the saw. Also, as indicated in Figure 2 of the drawings the cutting wheels 9 working in the recesses 11 of the respective disks are staggered with respect to each other so that the saw will not be appreciably weakened at the portion of its peripheral edge provided with the recess.

Figure 5:
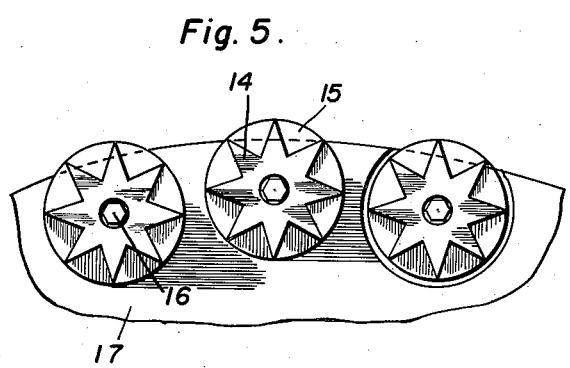
Figure 5 is a fragmentary side elevational view illustrating a modified form of cutting wheels.
Figure 7:
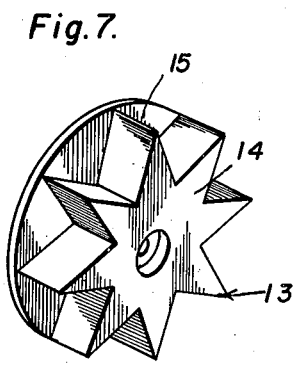
Figure 7 is a perspective view of one of the cutting wheels embodying the modified construction shown in Figures 5 and 6.
Figure 6:
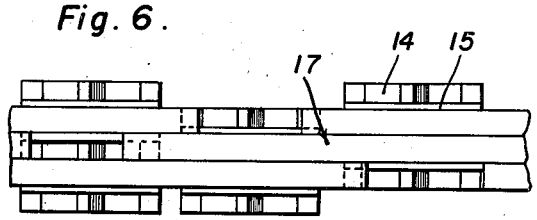
Figure 6 is an edge elevational view thereof.

In Figures 5 to 7, inclusive, a modified construction of the cutter 13 is illustrated which includes the toothed or star wheel 14 having a disk 15 secured to or formed therewith at one side of the star wheel, the diameter of the disk 15 corresponding to the diameter of the star wheel 14.

This form of cutter is likewise rotatably mounted on transversely extending bolts 16 adjacent the peripheral edge of the laminated circular saw 17 and the cutters are arranged at the periphery of the saw in the same manner as previously described.

Figure 8:
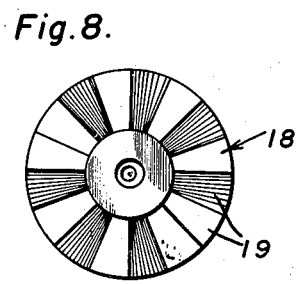
Figure 8 is a side elevational view of further modified construction of the cutting wheel.
Figure 9:
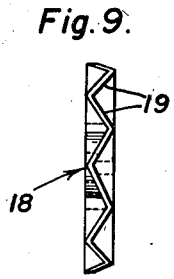
Figure 9 is an edge elevational view thereof.

In Figures 8 and 9 a further modified construction of the cutter is illustrated and which comprises a wheel 18 having segments 19 inclined with respect to the plane of the wheel and with adjacent segments oppositely inclined as shown in Figure 9.

In each form of the invention the cutters are rotated at a high peripheral speed and produce a hammering action in accomplishing the sawing action.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

What we claim as new is:

1. A saw comprising a flat laminated body, shafts extending transversely of the body adjacent its cutting edge, and cutters rotatably mounted on said shafts and including a cutter positioned in the plane of one of the laminations and a cutter positioned outwardly at one side of the body.

2. A saw comprising a flat laminated body, each lamination having recesses in its cutting edge and staggered with respect to each other, shafts extending transversely of the body and into said recess, and a plurality of cutters rotatably mounted on each of said shafts, at least one of the cutters working in one of the recesses.

3. A saw comprising a flat body, and toothed cutters rotatably mounted at the cutting edge of the body, said cutters comprising a toothed wheel, and a disk carried by the wheel at one side thereof.

CHARLES M. HASTY.
LEE R. BAKER.

REFERENCES CITED

The following references are of record in the file of this patent:

UNITED STATES PATENTS

| Number | Name | Date |
|---|---|---|
| 10,281 | Chapman | Nov. 29, 1853 |
| 227,758 | Frank | May 18, 1880 |
| 378,313 | Higgins | Feb. 21, 1888 |
| 826,817 | Wright | July 24, 1906 |
| 1,113,780 | Griesche et al. | Oct. 13, 1914 |

FOREIGN PATENTS

| Number | Country | Date |
|---|---|---|
| 371,396 | France | Mar. 6, 1907 |